UNITED STATES PATENT OFFICE.

ARTHUR ZART, OF VOHWINKEL, NEAR ELBERFELD, AND KURT DESAMARI, OF ELBERFELD, GERMANY, ASSIGNORS TO FARBENFABRIKEN VORM. FRIEDR. BAYER & CO., OF ELBERFELD, GERMANY, A CORPORATION OF GERMANY.

MONOAZO DYE.

1,058,692. Specification of Letters Patent. Patented Apr. 8, 1913.

No Drawing. Original application filed July 27, 1911, Serial No. 640,781. Divided and this application filed July 16, 1912. Serial No. 709,723.

*To all whom it may concern:*

Be it known that we, ARTHUR ZART and KURT DESAMARI, doctors of philosophy, chemists, citizens of the German Empire, residing, respectively, at Vohwinkel, near Elberfeld, and Elberfeld, Germany, have invented new and useful Improvements in Monoazo Dye, of which the following is a specification.

The present application which is a divisional application from our application Serial No. 640,781, filed July 27, 1911 concerns the manufacture and production of new azo coloring matters having most probably the following general formula:

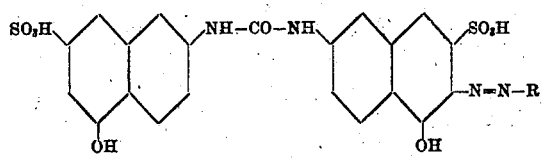

R meaning a derivative of the 2-amino-5-naphthol-7-sulfonic acid containing a heteronuclear ring:

(7) $SO_3H$
(5) $OH$ $\diagdown C_{10}H_4 \diagdown\diagup N \diagup C-C_6H_4-NH_2$
       $\diagup$      $X$ X meaning —NH—, which may be replaced by —O— and —S— and being hereinafter referred to in the claims as the divalent radical of the azole nucleus.

The new dyes are obtained by combining the diazo compounds prepared from aminophenyl-5-oxy-2-naphthimidazole-7-sulfonic acids:

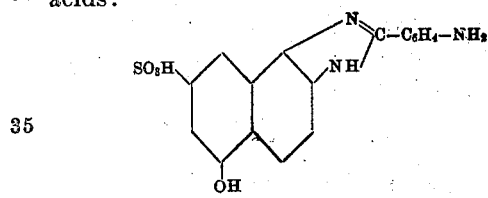

aminophenyl-5-oxy-2-naphthoxazole-7-sulfonic acids:

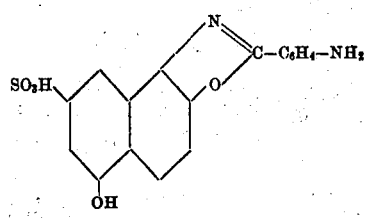

aminophenyl-5-oxy-naphthothiazole-7-sulfonic acids:

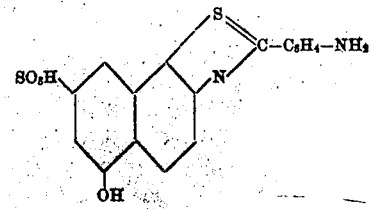

with the symmetrical urea obtained from 2-amino-5-naphthol-7-sulfonic acid:

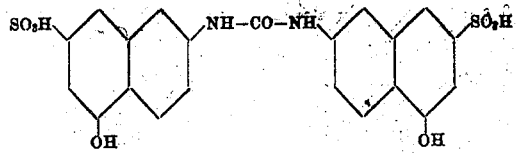

The new dyes having most probably the formula:

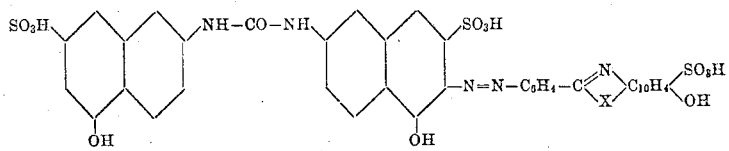

(X=NH, which may be replaced by O and S) ar after being dried and pulverized in the shape of their alkaline salts dark powders soluble in water; yielding upon reduction with stannous chlorid and hydrochloric acid a derivative of 2-amino-5-napthhol-7-sulfonic acid containing a heteronuclear ring:

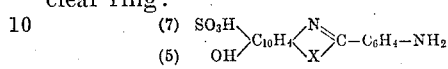

and a compound of the formula:

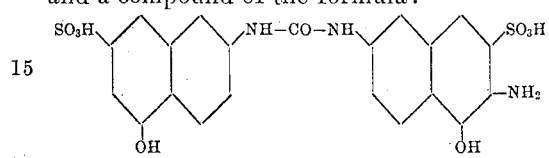

dyeing cotton from red to bluish-red shades is in the shape of its sodium salt a dark powder which is easily soluble in water with a red coloration and which is soluble in concentrated sulfuric acid with a bluish-red coloration. Upon reduction with stannous chlorid and hydrochloric acid it is split up into 2-para-aminophenyl-5-oxy-2-naphthimidazole-7-sulfonic acid and the asymmetrical urea of 2.5.7-aminonaphthol sulfonic acid and 2.6-diamino-5-naphthol-7-sulfonic acid. It dyes cotton red. The which on being developed with diazotized para-nitranilin change into shades fast to washing and capable of being discharged to a pure white.

The following example may further illustrate the invention, the parts being by weight:—357 parts (1 mol.) of para-aminophenyl-5-oxy-1.2-naphthimidazole-7-sulfonic acid are diazotized with 70 parts of sodium nitrite and hydrochloric acid and combined with 504 parts of the symmetrical urea of 2.5.7-aminonaphthol sulfonic acid containing an excess of acetate of sodium. The mixture is rendered alkaline with soda, heated and the dye is salted out with common salt, filtered off and dried.

The new dye having most probably the formula:

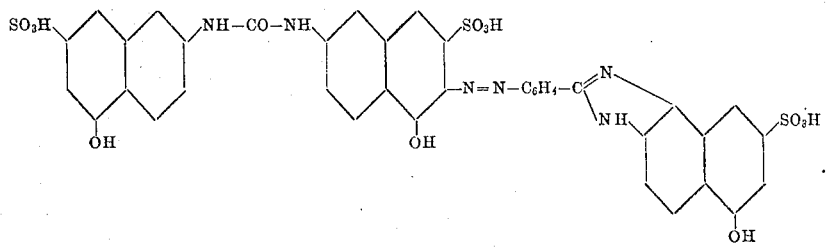

shade after being developed with diazotized para-nitranilin is blue-red fast to washing. It can be discharged to a pure white.

Meta-aminophenyl derivatives of the above mentioned heteronuclear compounds of 2.5.7-aminonaphthol sulfonic acids can be used.

We claim:—

1. As new products the monoazo-dyestuffs having most probably the formula:

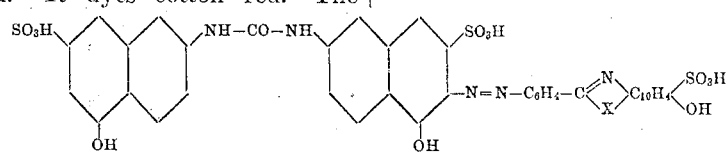

(X meaning a divalent radical in the azole nucleus) which are after being dried and pulverized in the shape of their alkaline salts dark powders soluble in water; yielding upon reduction with stannous chlorid and hydrochloric acid a derivative of 2-amino-5-naphthol-7-sulfonic acid containing a heteronuclear ring and a compound of the formula:

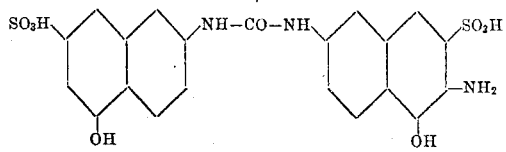

dyeing cotton from red to bluish-red shades which on being developed with diazotized para-nitranilin change into shades fast to washing and capable of being discharged to a pure white, substantially as described.

2. As a new product the dye having most probably the formula:

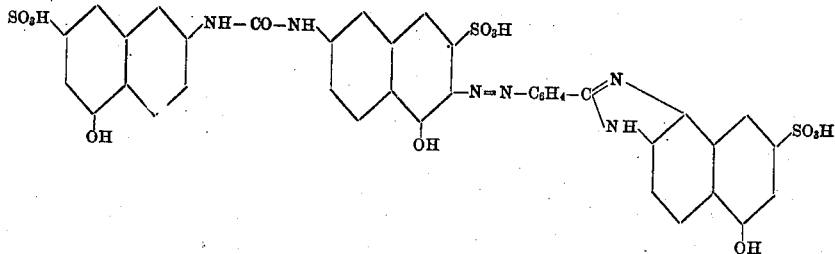

which is after being dried and pulverized in the shape of its sodium salt a dark powder soluble in concentrated sulfuric acid with a bluish-red coloration; yielding upon reduction with stannous chlorid and hydrochloric acid para-aminophenyl-5-oxy-2-naphthimidazole-7-sulfonic acid and the asymmetrical urea of 2.5.7-aminonaphthol sulfonic acid and 2.6-diamino-5-naphthol-7-sulfonic acid; dyeing cotton red, which shade after being developed with diazotized para-nitranilin is blue-red fast to washing which can be discharged to a pure white, substantially as described.

In testimony whereof we have hereunto set our hands in the presence of two subscribing witnesses.

ARTHUR ZART. [L. S.]
KURT DESAMARI. [L. S.]

Witnesses:
  HELEN NUFER,
  ALBERT NUFER.

---

Copies of this patent may be obtained for five cents each, by addressing the "Commissioner of Patents, Washington, D. C."